US009282075B2

(12) United States Patent
Smalley et al.

(10) Patent No.: US 9,282,075 B2
(45) Date of Patent: Mar. 8, 2016

(54) COLLABORATIVE COMPOSITION OF MULTIMEDIA COMMUNICATIONS

(71) Applicant: Comcast Cable Communications, LLC, Philadelphia, PA (US)

(72) Inventors: Preston G. Smalley, Danville, CA (US); Ryan A. King, San Francisco, CA (US); Justin B. Miller, Los Gatos, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 152 days.

(21) Appl. No.: 13/771,657

(22) Filed: Feb. 20, 2013

(65) Prior Publication Data
US 2014/0237056 A1 Aug. 21, 2014

(51) Int. Cl.
*G06F 15/16* (2006.01)
*H04L 12/58* (2006.01)

(52) U.S. Cl.
CPC ..................................... *H04L 51/32* (2013.01)

(58) Field of Classification Search
CPC ... G06Q 30/02; G06Q 30/0631; G06Q 50/01; G06Q 30/0241; G06Q 30/0269; G06Q 30/0251; G06Q 30/0255; H04L 60/306; H04L 67/22; H04L 51/10; H04L 51/066; H04L 67/2823; H04N 21/4532; H04N 21/4668; H04N 21/812; H04N 21/23424; H04N 21/234309
See application file for complete search history.

(56) References Cited

U.S. PATENT DOCUMENTS

| | | | |
|---|---|---|---|
| 2003/0191816 A1* | 10/2003 | Landress et al. | 709/219 |
| 2013/0046781 A1* | 2/2013 | Frankel et al. | 707/769 |
| 2013/0275525 A1* | 10/2013 | Molina et al. | 709/206 |
| 2013/0325978 A1* | 12/2013 | Mansfield et al. | 709/206 |
| 2014/0229552 A1* | 8/2014 | Ranganath et al. | 709/206 |

* cited by examiner

*Primary Examiner* — Brian J Gillis
*Assistant Examiner* — Kamaran Mohammadi
(74) *Attorney, Agent, or Firm* — Ballard Spahr LLP

(57) ABSTRACT

Provided are methods and systems for providing personalized communications. An exemplary method can comprise determining an interest level in contributing to a media message for a recipient. The method can comprise selecting, based on the interest level, a plurality of contributors from a network of members associated with a recipient. The method can also comprise receiving at least two messages in one or more formats from the plurality of contributors. The method can further comprise combining the at least two messages into a media message. The method can comprise providing the media message to a recipient.

36 Claims, 8 Drawing Sheets

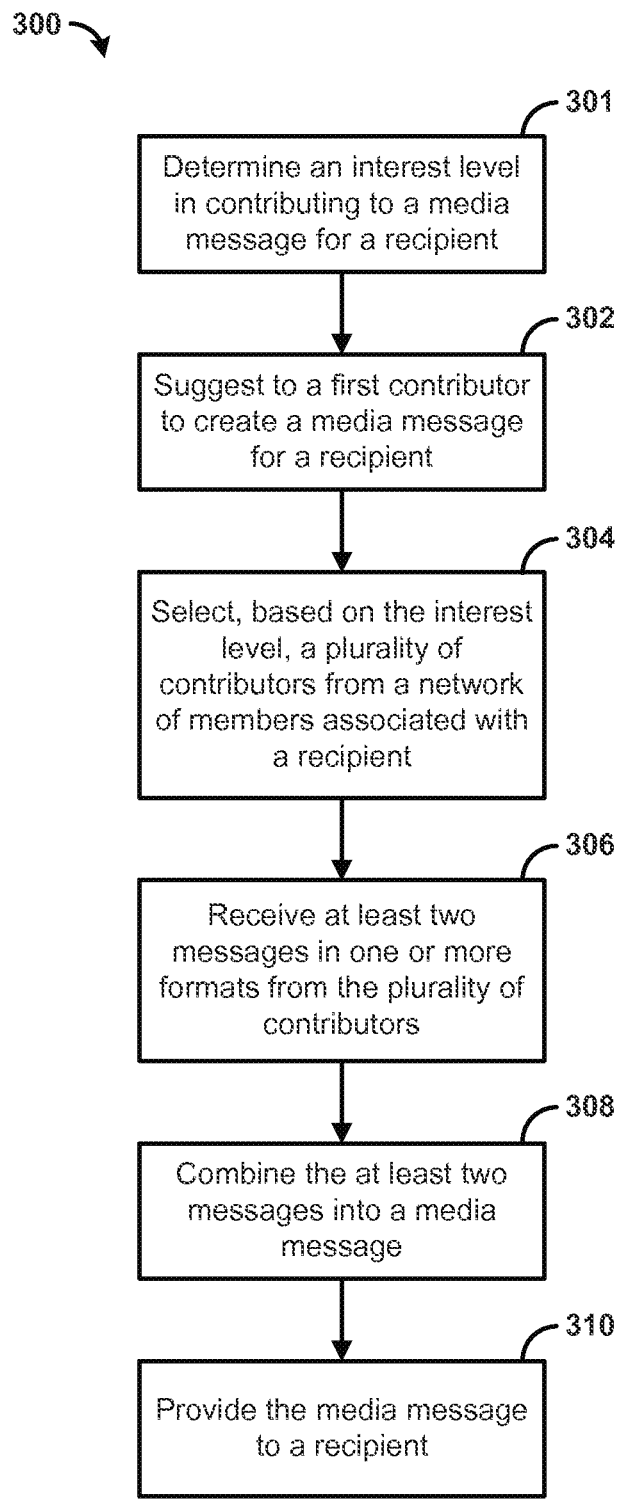

COLLABORATIVE COMPOSITION OF MULTIMEDIA COMMUNICATIONS

BACKGROUND

As technology develops, users continue to connect to networks with a variety of devices with different capabilities. These devices are often used to communicate among users. As different devices can use different formats and connect through different kinds of networks, collaboration can be difficult to accomplish. Thus, there is a need for more sophisticated systems and methods for providing collaborative composition of multimedia communications.

SUMMARY

It is to be understood that both the following general description and the following detailed description are exemplary and explanatory only and are not restrictive, as claimed. Provided are methods and systems for providing a personalized communication. Methods can comprise determining an interest level in contributing to a media message for a recipient. Methods can comprise selecting, based on the interest level, a plurality of contributors from a network of members associated with a recipient. Methods can also comprise receiving at least two messages in one or more formats from the plurality of contributors. Methods can further comprise combining the at least two messages into a media message. Methods can comprise providing the media message to a recipient.

In one aspect, methods can comprise identifying an event relevant to a contact. Methods can also comprise identifying a network member associated with the contact. Methods can comprise determining an interest level of the network member in contributing to personalized content related to the event. Methods can further comprise notifying the network member of the event relevant to the contact. Methods can comprise providing the network member an interface configured for organizing collaboration between the network member and a plurality of other network members to create the personalized content related to the event. Methods can comprise composing the personalized content based at least on a compilation of one or more messages from the network member and the plurality of other network members.

In another aspect, methods can comprise determining an interest level in contributing to a media message for a recipient. Methods can comprise selecting plurality of contributors. In one aspect, at least one contributor of the plurality of contributors can be selected based on the interest level. In another aspect, the plurality of contributors can be social contacts of a recipient. Methods can comprise receiving one or more messages in one or more formats from the plurality of contributors. Methods can also comprise combining the one or more communications into a message in one format. Methods can further comprise providing the message in one format to a recipient. In one aspect, the message in one format can be editable by additional contributors.

In another aspect, methods can comprise determining an interest level in contributing to a composite media message for a reference network node. Methods can comprise selecting, based on the interest level, a plurality of network nodes associated with a reference network node. In an aspect, the plurality of network nodes can be contained in a small-world network. Methods can comprise receiving a first media message in a first format from a user. The plurality of network nodes and the user can be social contacts of the reference network node. Methods can comprise providing the first media message to the plurality of network nodes. Methods can further comprise receiving one or more additional media messages from the plurality of network nodes. Methods can also comprise combining the first media message and the one or more additional media messages into the composite media message. Methods can comprise providing the composite media message to the reference network node.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 is a flowchart illustrating an exemplary method for providing a communication;

DETAILED DESCRIPTION

Figure 1:
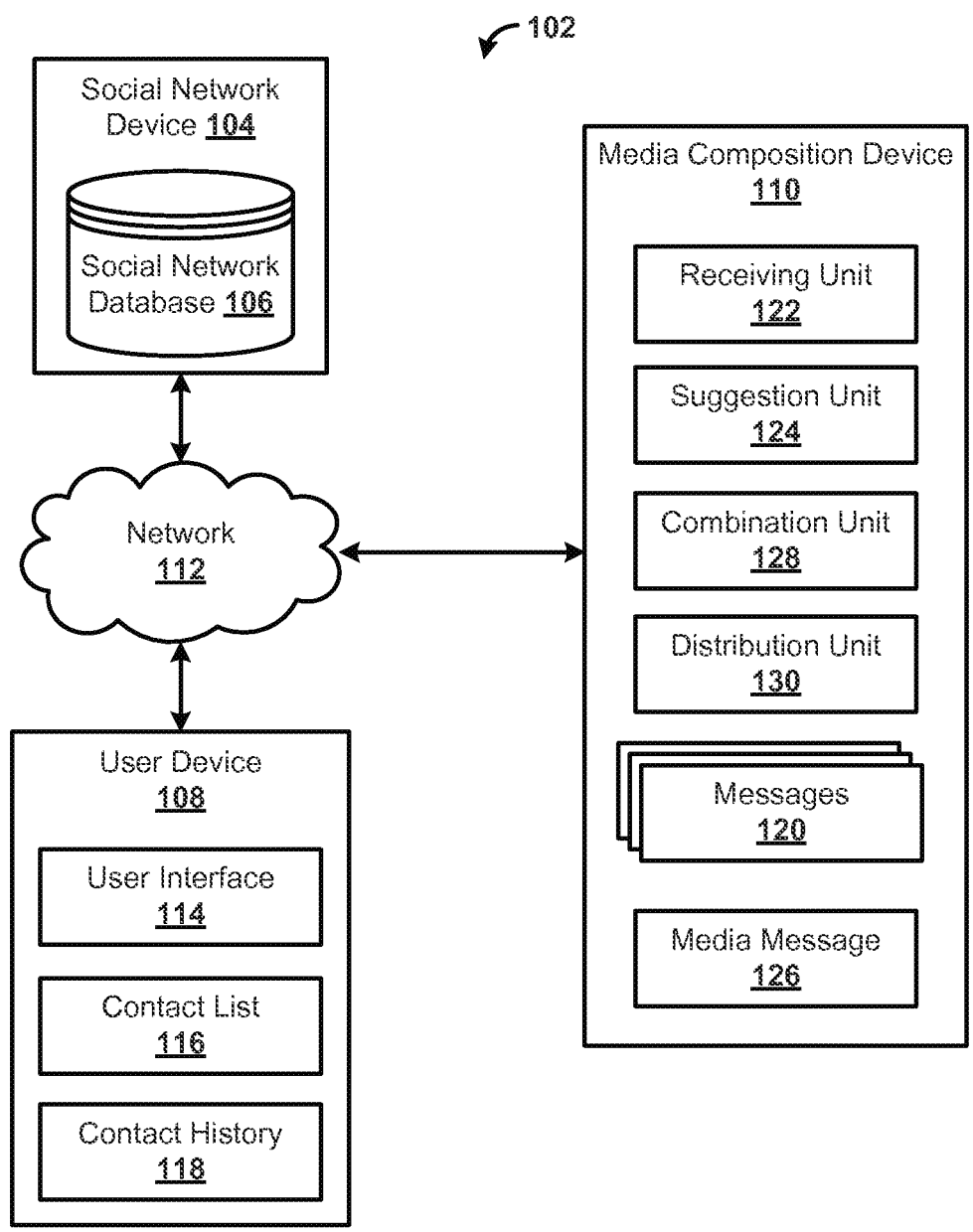
FIG. 1 is a block diagram illustrating various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing personalized communications. These personalized communications can be generated based on social networks or contact lists for specific events such as birthdays, weddings, anniversaries, graduations, religious events, and the like. An environment can be provided whereby users can collaborate with each other on a personalized media message related to the event and the personalized media message can be delivered to the intended recipient.

FIG. 1 is a block diagram illustrating various aspects of an exemplary system 102 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware. In one aspect, the system 102 can comprise a social network device 104 configured to provide users the ability to create and manage a social network. For example, the social network device 104 can comprise a social network database 106 configured to store a plurality of social network relationships. By accessing the social network device 104, users can create a social network by creating a profile and associating other users with the user's profile. A variety of associations can be employed for creating a social network, such as friend, family, classmate, business colleague, and the like. Users can manage information by sharing information publicly or by sharing information with only a portion of the users' social network. For example, a user can create a private event or forum where only a portion of the user's social network is invited to the forum. Thus, only the invited portion of users in the social network would have access to view and contribute to the event or forum.

In one aspect, the system 102 can comprise a user device 108. The user device 108 can be configured to communicate with the social network device 104 and with a media composition device 110 through a network 112. The user device 108 can comprise a mobile device, personal computer, tablet computer, or other electronic device capable of communicating across a network 112. In one aspect, the user device 108 can comprise a user interface 114, such as a software application. The user interface 114 can comprise a web browser, mobile device application, and/or other software capable of interfacing with the social network device 104 and/or the media composition device 110. In another aspect, the user device 108 can comprise a contact list 116. For example, if the user device 108 is a mobile device (e.g., tablet, cell phone) or other similar device (e.g., desktop computer, laptop), then the contact list 116 can be located in an address book stored in the user device. For example, an address book can comprise contact names and contact information, such as email addresses, physical addresses, telephone numbers, birthday information, and the like. The contact list 116 can be associated with a contact history 118 that can comprise, for example, a call history, email history, text history, contact information, and/or other information related to the contacts and the interactions between the user and the contacts.

In an aspect, the system 102 can comprise a media composition device 110. The media composition device 110 can be configured to store one or more messages 120 in one or more formats. The media composition device 110 can comprise a receiving unit 122 configured to receive and store the messages 120 from one or more user devices 108. The one or more formats can comprise video formats, audio formats, image formats, document formats, and the like. For example, a user can record a video and transmit the video to the media composition device 110. Alternatively, the user can transmit an audio message, image message, text message, or other kind of message to the media composition device 110.

In an aspect, the media composition device 110 can comprise a suggestion unit 124 configured to suggest a contact for whom the user can make a media message 126. The suggestion unit 124 can apply logic to a set of rules to determine whether predetermined criteria are met. For example, the suggestion unit 124 can determine an interest level of at least one contact of a plurality of contacts. The interest level can indicate an interest of the contact in contributing to a combined media message for a recipient. In one aspect, the suggestion unit 124 can receive a list of contacts associated with a user from a user device 108 or from the social network device 104. For example the list of contacts can comprise the contact list 116 from the user device and/or a contact list from the social network database 106. The user can be a collaborator or recipient of the combined media message 126. The suggestion unit 124 can also receive social information associated with the list of contacts. For example, the social information can comprise information on a user profile of a social network, an event history between the user and the contact, and the like. The event history can comprise a history of interactions on a social network, such as a history of messages, posts, likes, invites, requests, views, and the like. As another example, the social information can comprise a contact history 118 from the user device. As described above, the contact history 118 can comprise, for example, a call history, email history, text history, contact information, and/or other information related to the contacts and the interactions between the user and the contacts. In one aspect, the social information can be used for determining the interest level.

The suggestion unit 124 can also determine a relationship value based on the list of contacts and the social information. The relationship value can comprise information indicating the intensity and/or importance of a relationship between users. The relationship value can be based upon the social information. For example, in calculating the relationship value the suggestion unit 124 can determine one or more selection factors, such as the number of contacts in common between users, the number of photographs or other social data associated with users, the number of times a user has posted another user's social network profile, the type of relationship of users, the length of time users have been associated with each other, the amount of time since users last communicated, and other information relevant to assessing the relationship between users. In one aspect, the relationship value can be used for determining the interest level.

In one aspect, the suggestion unit 124 can suggest to a user one or more potential recipients of a media message 126. For example, the one or more potential recipients can be selected based on an interest level of the user in contributing to the media message of the potential recipient. The suggested recipients can be provided based on a ranked list of contacts to whom a user might want to send a message. The ranked list can be based on the social information and/or relationship value. For example, the ranked list can rank those who have a special event (e.g., a birthday) occurring within a certain period of time. The ranked list can be generated based on the selection factors. For example, the ranked list can comprise contacts who have interacted with a user's social profile within a certain period of time. As another example, the suggestion unit 124 can select a contact that has an event (e.g., birthday, wedding, anniversary) within a short period of time from the current time. The suggestion unit 124 can create a first list of X number of contacts that are associated with a specified type of event occurring within Y (e.g., five, ten, twenty, thirty) number of days. The first list can be refined to a second list based on one or more selection factors. In one aspect, the second list can identify contacts to whom the user is most likely to provide a media message 126. For example, the suggestion unit 124 can create the second list of contacts by identifying contacts from the first list that the user has interacted with by posting to the contact's profile, whom the user has received Z number of posts from a contact in W amount of time, whom the user has appeared in a photo together, and/or the like.

In another aspect, the suggestion unit 124 can suggest to a user one or more collaborators to invite to contribute to the media message 126. The suggestion unit 124 can create a ranked contributor list based on the social information and/or relationship value determined by the media composition device 110 in relation to the received list of contacts. In one aspect, the one or more collaborators can be suggested based on an interest level determined of the one or more collaborators in contributing to the media message.

In an aspect, the media composition device 110 can comprise a combination unit 128 configured to combine the messages 120 into a single media message 126. The media message 126 can be in one format, such as a video format. The media message 126 can be a compilation of the messages 120 in one or more formats. For example, the media message 126 can be a collection of several videos received from mobile devices combined as one video. As another example, the media message 126 can be a collection of videos, audio records, emails, text messages, or other files combined as a video, audio file, image file, text file, or other similar format.

In one aspect, the media composition device 110 can comprise a distribution unit 130 configured to provide and/or distribute the media message 126 to a recipient. For example, the distribution unit 130 can transmit the media message 126 to the social network device 104 to post the media message 126 on a social profile of the recipient. Additionally, the distribution unit 130 can email the media message 126, send the media message 126 to a short message service (SMS) address, and/or deliver the media message 126 to some other rendering device. Additionally, the distribution unit 130 can initiate a process to mail a physical copy of the media message in compact disc (CD), digital video disc (DVD), or other physical format.

Figure 2A:
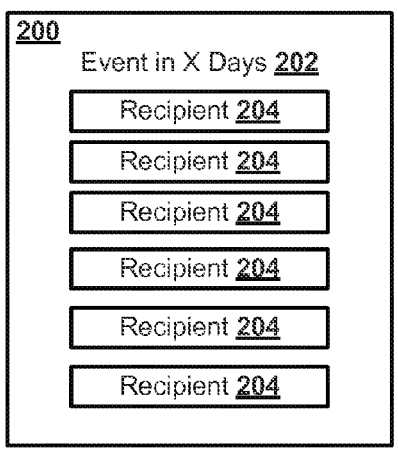
FIG. 2A shows an exemplary user interface for suggesting contacts to a user.

FIGS. 2A-2F are representations of user interfaces configured to provide personalized communication. FIG. 2A shows an exemplary user interface for suggesting contacts to a user.

The user interface 200 can comprise an event indicator 202. The event indicator 202 can comprise text and/or graphics indicating a specific event occurring in a specified number of days. The user interface 200 can comprise a list of suggested recipients 204 who are associated with the specified event within the specified time frame. For example, the event indicator 202 can indicate a birthday occurring within a specified number of days. In this example, the list of suggested recipients 204 can comprise a list of contacts in the user's social network or address book who have a birthday occurring within the specified time period. The suggested recipients 204 can be provided to the user interface 200 by the media composition device based on logic performed in the suggestion unit. The user interface 200 can be configured to allow the user to select one or more of the suggested contacts, and the selected contacts can be transmitted to the media composition device in order to begin the process of allowing users to collaborate on a media message to send to the selected contact.

Figure 2B:
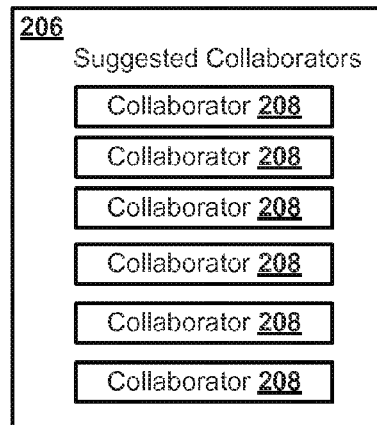
FIG. 2B shows an exemplary user interface for determining collaborators.

FIG. 2B shows an exemplary user interface 206 for determining collaborators. After the media composition device receives a selected contact as a recipient for a media message, the user interface 206 can provide a list of suggested collaborators 208. The list of suggested collaborators 208 can be provided to the user interface 206 by the media composition device based on logic performed in the suggestion unit. The user can select one or more collaborators 208 from the list of suggested collaborators, and the user devices can transmit the selected collaborators to the media composition device. The media composition device can transmit invitations to the selected collaborators to contribute a message to the selected recipient.

Figure 2C:
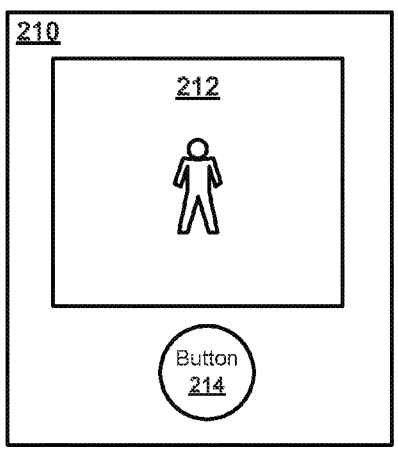
FIG. 2C shows an exemplary user interface for creating a message for the selected recipient.

FIG. 2C shows an exemplary user interface 210 for creating a message for the selected recipient. For example, the user interface 210 can comprise a screen 212 showing the input of a camera associated with the user device. The user interface 210 can comprise a button 214 to control the recording of the input of the camera. Other user interfaces can be provided for user devices that do not have an associated camera. For example, a user can be prompted to record an audio clip of the user. As another example, the user can upload a picture and/or input text into the user interface. After the message is received at the user interface 210, the message can be transmitted to the media composition device.

Figure 2D:
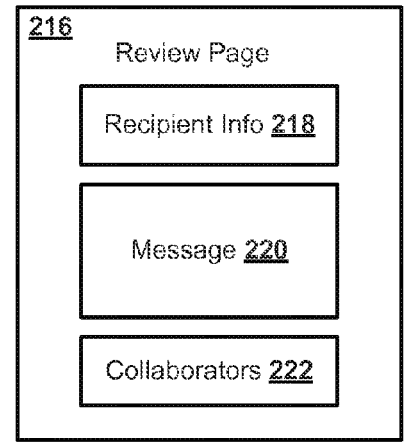
FIG. 2D shows an exemplary user interface for reviewing a message.

FIG. 2D shows an exemplary user interface 216 for reviewing a message. The user interface 216 can comprise a recipient info box 218 with information about the recipient and scheduled delivery date of the message. In one aspect, the user interface 216 can comprise a window 220 for reviewing the media message. The user interface 216 can also comprise a list of all the collaborators 222 associated with the media message.

Figure 2E:
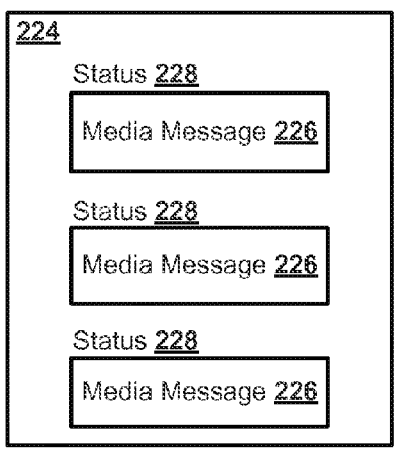
FIG. 2E shows an exemplary user interface for reviewing the status of one or more media messages.

FIG. 2E shows an exemplary user interface 224 for reviewing the status of one or more media messages. The user interface can comprise one or more boxes 226, each box indicating an associated media message in which the user is invited as a contributor and/or the initiating contributor. A status 228 can be proximate to the box, and the status can indicate the current status of the media message. Statuses 228 can indicate the state of the media message. For example, a status 228 can indicate that the media message is waiting for the user's message, ready to send to the recipient, recently started, and the like.

Figure 2F:
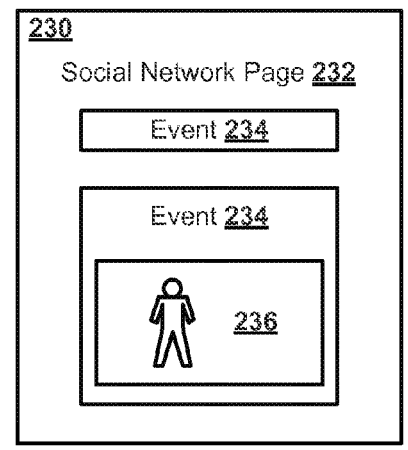
FIG. 2F shows an exemplary user interface for accessing information on a social network device.

FIG. 2F shows an exemplary user interface 230 for accessing information on a social network device. When the media message is ready to be transmitted to the recipient, the media composition device can transmit the message to the social media server. The social network device can provide the media message on a page 232 associated with the recipient. The user interface can comprise one or more events 234 associated with the recipient. Each event 234 can comprise text, video, picture, and the like. For example, the event 234 can comprise a box 236 representing and linking to the media message. In another aspect, the media message can be provided to the recipient directly through a user interface on the user device.

FIG. 3 is a flowchart illustrating an exemplary method 300 for providing a communication. In step 301, an interest level in contributing to a media message for a recipient can be determined. For example, an interest level can be determined for at least one of a plurality of network members. In step 302, a suggestion to create a media message for a recipient can be suggested to a first contributor of a plurality of contributors, based on an event and an interest level of the first contributor. The media message can be personalized to the recipient based at least on an event associated with the recipient. For example, the event can comprise at least one of a birthday, an anniversary, a graduation, a wedding, religious event, or other event relevant to a recipient. In one aspect, the interest level of the first contributor can be determined based upon at least one of a number of social contacts associated with both the first contributor and the recipient, a length of time of a relationship between the first contributor and the recipient, a classification of the relationship between the first contributor and the recipient, a frequency of interactions between the first contributor and the recipient, and a time of a last interaction between the first contributor and the recipient.

In step 304, a plurality of contributors can be selected, based on the interest level, from a network of members associated with a recipient. For example, at least one of the plurality of contributors selected can be selected based on the interest level determined for that contributor. In one aspect, the network can comprise at least one of a social network or a contact list. In one aspect of step 304, contributors of the plurality of contributors can be selected based upon at least one of the following: a number of social contacts associated with both the selected contributor and the first contributor, a length of time of a relationship between the selected contributor and the first contributor, a classification of the relationship between the selected contributor and the first contributor, a frequency of interactions between the selected contributor and the first contributor, a time of a last interaction between the selected contributor and the first contributor, and the like. In another aspect of step 304, each contributor of the plurality of contributors can be selected based upon at least one of the following: a number of social contacts associated with both the selected contributor and the recipient, a length of time of a relationship between the selected contributor and the recipient, a classification of the relationship between the selected contributor and the recipient, a frequency of interactions between the selected contributor and the recipient, a time of a last interaction between the selected contributor and the recipient, and the like.

In step 306, at least two messages can be received in one or more formats from the plurality of contributors. In step 308, the at least two messages can be combined into a media message. For example, the at least two messages can comprise at least one of a video captured from a mobile device, a video captured from a computer camera, an image associated with an audio message, or a file uploaded to a social network. In step 310, the media message can be provided to a recipient. In an aspect of step 310, at least one of the following can occur: the media message can be posted on a social network, a DVD of the media message can be mailed, the media message can be emailed, the media message can be sent to a short message service (SMS) address, the media message can be delivered to a rendering device, and the like.

Figure 4:
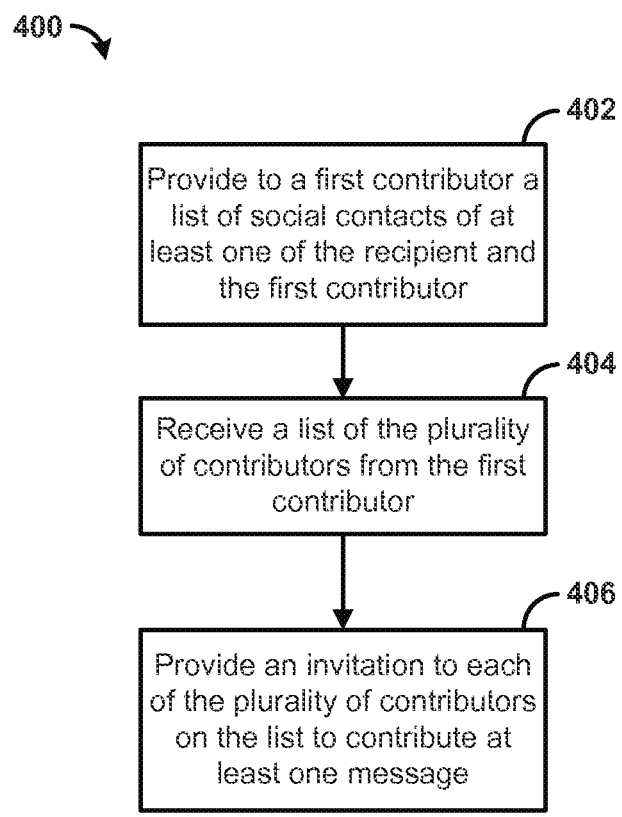
FIG. 4 is a flowchart illustrating an another exemplary method for providing a communication.

FIG. 4 is a flowchart illustrating an exemplary method 400 for providing a communication. In one aspect, the method 400 can implement step 304 of method 300, in which a plurality of contributors can be selected. In step 402, a list of social contacts of at least one of the recipient and the first contributor can be provided to the first contributor. In step 404, a list of the plurality of contributors can be received from the first contributor. The plurality of contributors can be selected by the first contributor from the list of social contacts. In step 406, an invitation can be provided to each of the plurality of contributors on the list to contribute at least one message of the at least two messages.

Figure 5:
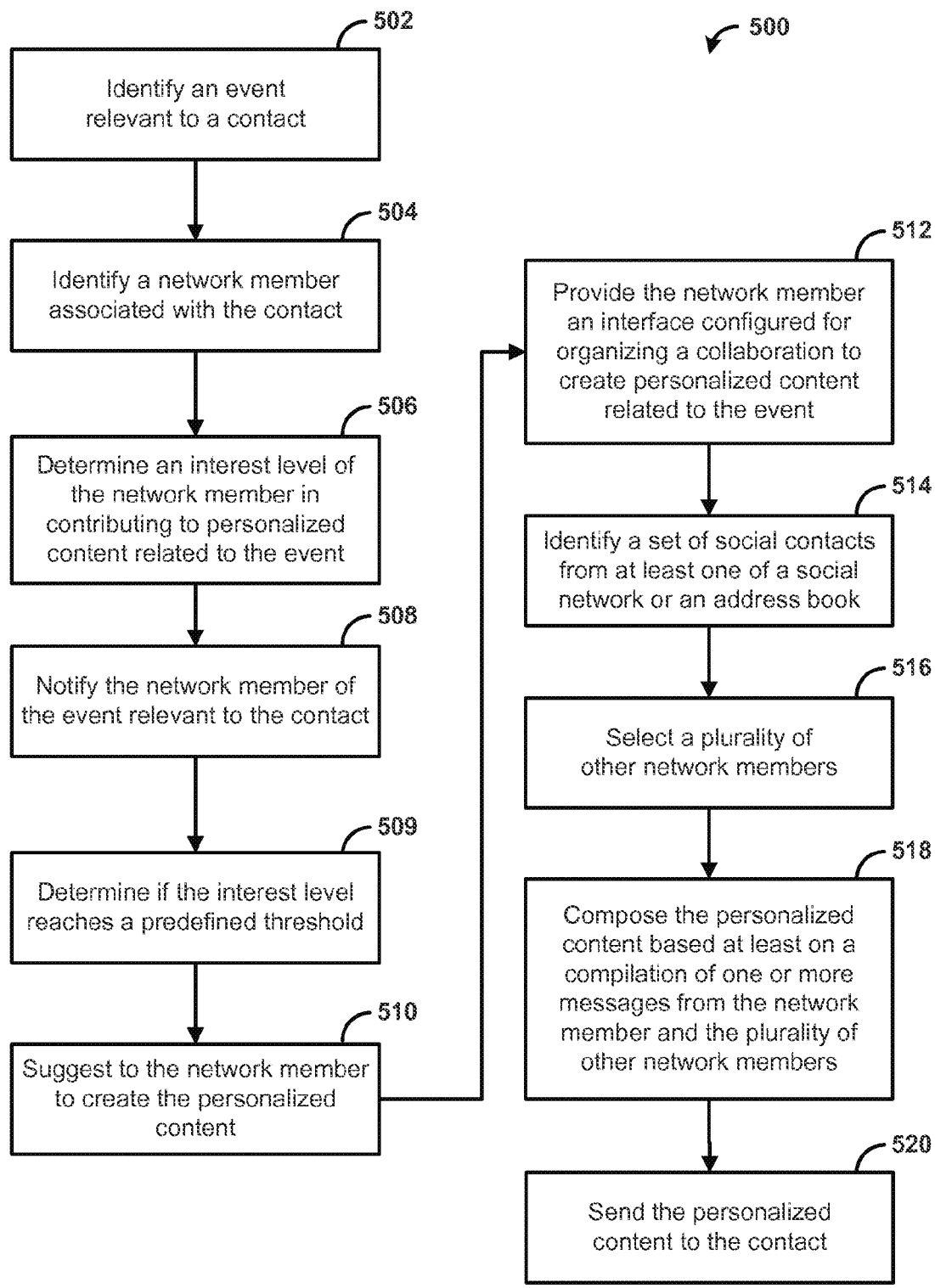
FIG. 5 is a flowchart illustrating another exemplary method for providing a communication.

FIG. 5 is a flowchart illustrating an exemplary method 500 for providing a communication. In step 502, an event relevant to a contact can be identified. For example, the event can be at least one of a birthday, an anniversary, a graduation, a wedding, a religious event, a holiday, or other event relevant to a recipient. In step 504, a network member associated with the contact can be identified. In step 506, an interest level of the network member in contributing to a personalized message related to the event can be determined. In one aspect, step 506 can be based on at least one of the following: a number of contacts associated with both the network member and the contact, a length of time of a relationship between the network member and the contact, a classification of the relationship between the network member and the contact, a frequency of interactions between the network member and the contact, a time of a last interaction between the network member and the contact, and the like.

In step 508, the network member can be notified of the event relevant to the contact. In step 509, it can be determined if the interest level reaches a predefined threshold. In step 510, if the interest level reaches a predefined threshold, a suggestion can be provided to the network member to create the personalized content. If the interest level does not reach a predefined threshold, then the method 500 can end. In step 512, the network member can be provided an interface configured for organizing collaboration between the network member and a plurality of other network members to create personalized content related to the event. In one aspect of step 512, at least a part of the personalized content can be posted on a social network. In another aspect of step 512, the plurality of other network members can be suggested to the network member based at least on a social relationship of the plurality of other network members to the contact. In another aspect, the interface can be configured to allow at least one of the network member and the plurality of other network members to edit the personalized content. In step 514, a set of social contacts can be identified from at least one of a social network or an address book. The set of social contacts can comprise the contact.

In step 516, the plurality of other network members can be selected. In one aspect of step 516, the plurality of other network members can be selected based an interest level. For example, the interest level can be based upon at least one of the following: a number of network members associated with both the selected other network member and the contact, a length of time of a relationship between the selected other network member and the contact, a classification of the relationship between the selected other network member and the contact, a frequency of interactions between the selected other network member and the contact, a time of a last interaction between the selected other network member and the contact, and the like. In another aspect of step 516, the plurality of other network members can be selected based upon an interest level, which can be based upon at least one of the following: a number of network members associated with both the selected other network member and the network member, a length of time of a relationship between the selected other network member and the network member, a classification of the relationship between the selected other network member and the network member, a frequency of interactions between the selected other network member and the network member, a time of a last interaction between the selected other network member and the network member, and the like.

In step 518, the personalized content can be composed based at least on a compilation of one or more messages from the network member and the plurality of other network members. The personalized content can be compiled in a variety of ways from completely human produced to fully automated. In one aspect, a blended approach can be taken that combines automation and human production. For example, the personalized content can automatically be placed on a server folder with static branded elements and then compiled by a human using a video compilation service. The video compilation service can comprise a pre-built set of templates that have a particular layout and soundtrack that fits the occasion type. Accordingly, the user can select a template, layout, soundtrack, and the like. Then, the combined media message can be automatically generated based on the user selections and the received messages. In step 520, the personalized content can be sent to the contact.

Figure 6:
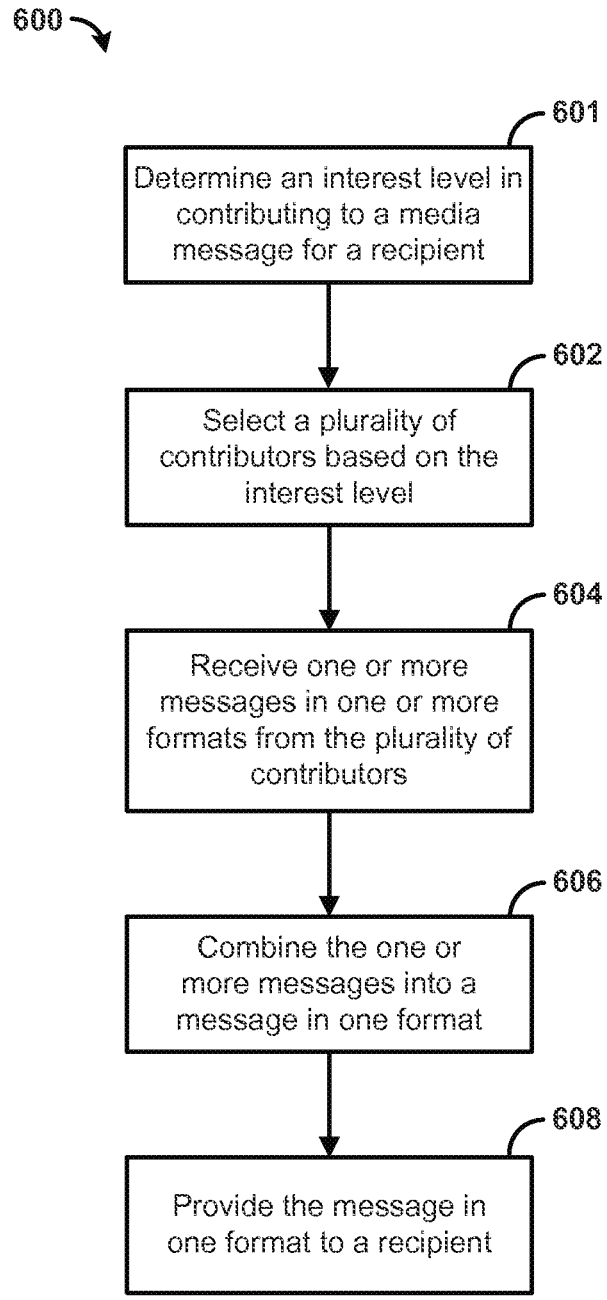
FIG. 6 is a flowchart illustrating another exemplary method for providing a communication.

FIG. 6 is a flowchart illustrating an exemplary method 600 for providing a communication. In step 601, an interest level in contributing to a media message (e.g., the message in one format) for a recipient can be determined. For example, an interest level can be determined for some or all of a plurality of social contacts of the recipient. In step 602, a plurality of contributors can be selected from the social contacts of the recipient. In one aspect, at least one contributor of the plurality of contributors can be selected based on the interest level of the at least one contributor. In step 604, one or more messages can be received in one or more formats from the plurality of contributors. In step 606, the one or more messages can be combined into a message in one format. In one aspect, the one format can comprise a video format, audio format, image format, text format, or other media format. In step 608, the message in one format can be provided to the recipient. In one aspect, the message in one format can be editable by the additional contributors after the message in one format is provided to the recipient. In one aspect, the message in one format can be provided to the recipient on a social network. For example, the additional contributors can be social contacts on the social network who can access the message.

Figure 7:
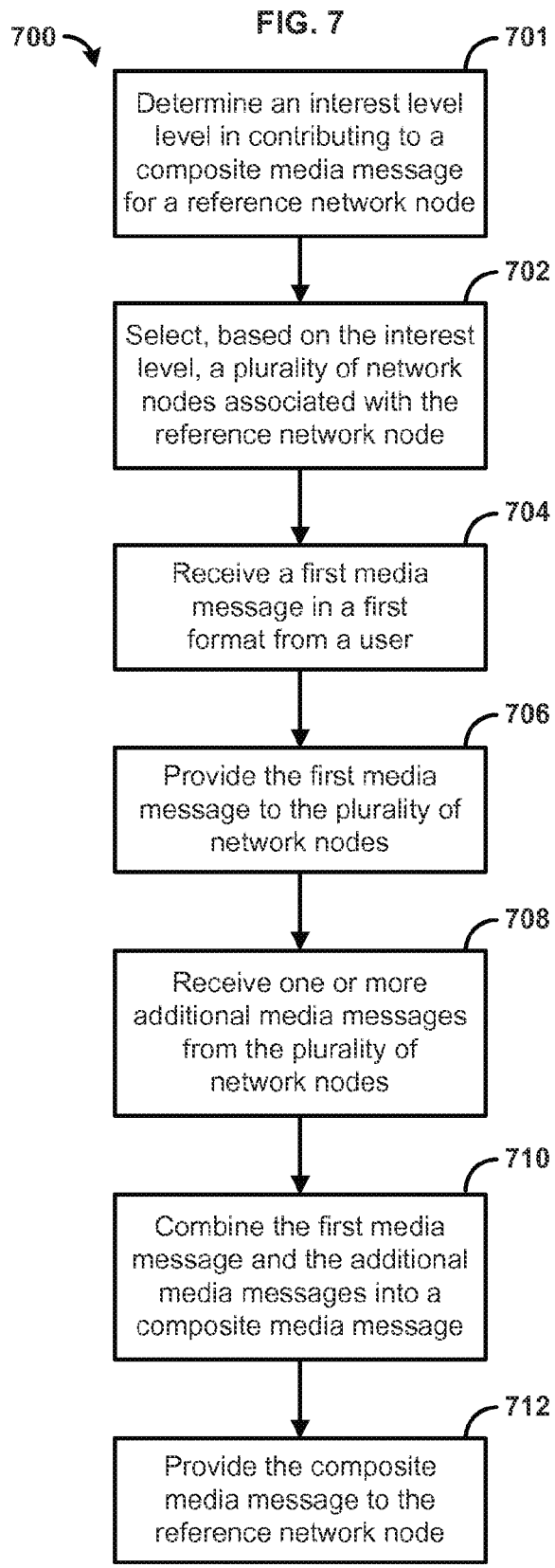
FIG. 7 is a flowchart illustrating another exemplary method for providing a communication.

FIG. 7 is a flowchart illustrating an exemplary method 700 for providing a communication. In step 701, an interest level in contributing to a composite media message for a reference network node can be determined. For example, an interest level can be determined for some or all of a plurality of network nodes associated with the reference node. In step 702, the plurality of network nodes associated with a reference network node can be selected based on the interest level. As an example, a first network node can be selected based on the interest level. Then, the first network node can select additional network nodes of the plurality of network nodes. As another example, the additional network nodes can be selected based on interest levels determined for some or all of the additional network nodes.

In one aspect, the plurality of network nodes can comprise a small-world network. A small-world network is a type of network in which most nodes can be reached from every other node by a small number of hops or steps. For example, a small-world network can comprise a network in which each of the network nodes are associated with all of the other network nodes within a predefined range of degrees of separation such as between 1 and 2 degrees of separation or between 1 and 3 degrees of separation. As a further example, if user A is directly associated with users B and C but user B is not directly associated with user C, then B is separated from A by one degree of separation and separated from C by two degrees of separation. In step 704, a first media message in a first format can be received from a user. In one aspect, the first format can comprise a video format, audio format, image format, text format, or other media format. In an aspect, the plurality of network nodes and the user can be social contacts of the reference network node. In step 706, the first media message can be provided to the plurality of network nodes. In one aspect, the first media message can be provided to the plurality of network nodes through a mobile device.

In step 708, one or more additional media messages can be received from the plurality of network nodes. In step 710, the first media message and the one or more additional media messages can be combined into a composite media message. In step 712, the composite media message can be provided to the reference network node.

Figure 8:
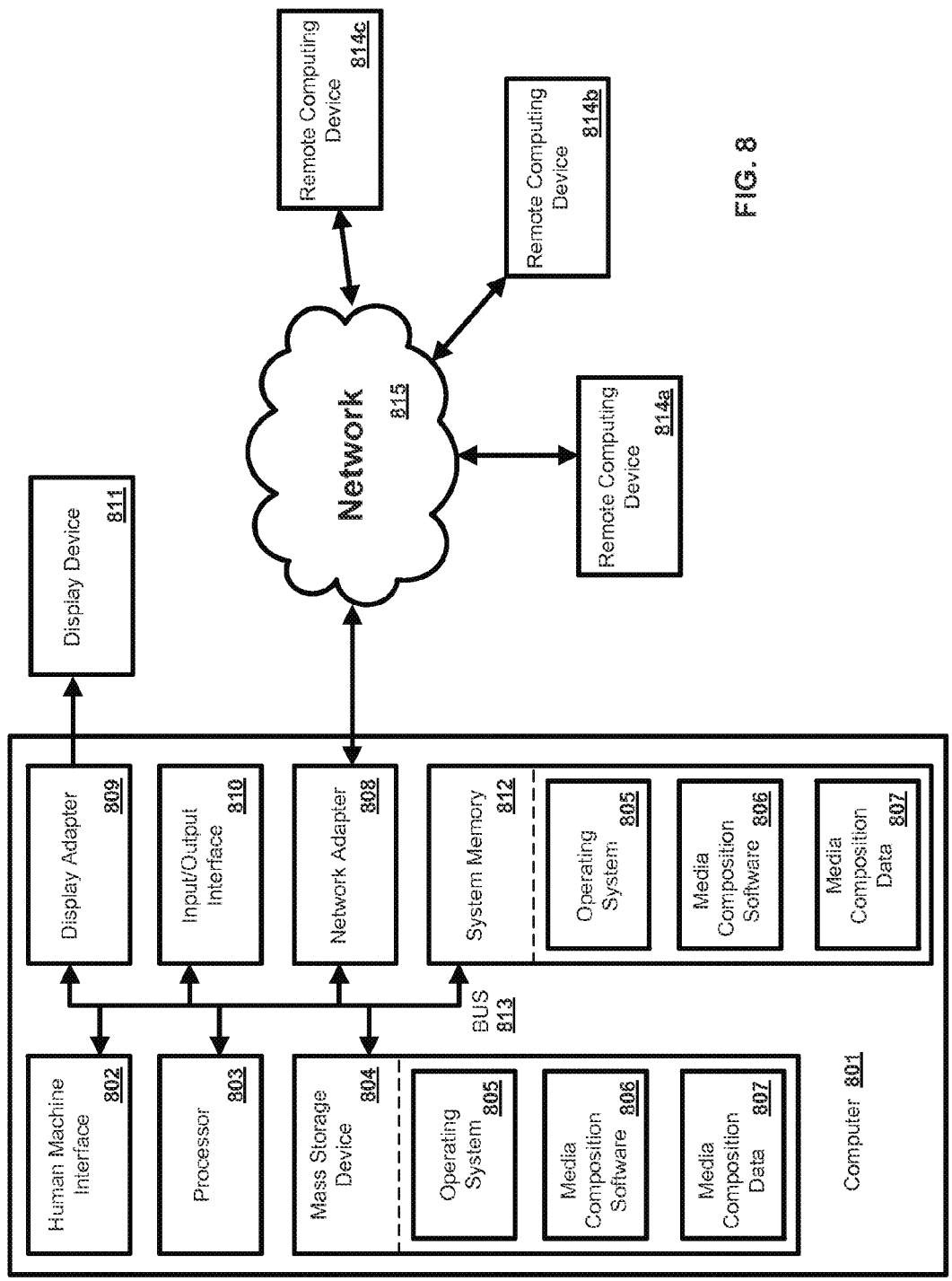
FIG. 8 is a block diagram of an exemplary computing device in which the present systems and methods can operate.

In an exemplary aspect, the methods and systems can be implemented on a computer 801 as illustrated in FIG. 8 and described below. By way of example, the media composition device 110 of FIG. 1 can be a computer as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, media composition software 806, media composition data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as media composition data 807 and/or program modules such as operating system 805 and media composition software 806 that are immediately accessible to and/or are presently operated on by the processing unit 803.

In another aspect, the computer 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and media composition software 806. Each of the operating system 805 and media composition software 806 (or some combination thereof) can comprise elements of the programming and the media composition software 806. Media composition data 807 can also be stored on the mass storage device 804. Media composition data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via Input/Output Interface 810. Any step and/or result of the methods can be output in any form to an output device. Such output can be any form of visual representation, including, but not limited to, textual, graphical, animation, audio, tactile, and the like. The display 811 and computer 801 can be part of one device, or separate devices.

The computer 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computer 801 and a remote computing device 814a,b,c can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of media composition software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining an interest level in contributing to a combined media communication for a recipient, wherein the interest level is based at least in part on a call history between a user and the recipient;
   selecting, based on the interest level, a plurality of contributors from a network of users associated with the recipient;
   receiving at least two media communications in one or more formats from at least two of the plurality of contributors;
   combining the at least two media communications into the combined media communication; and
   providing the combined media communication to the recipient.

2. The method of claim 1, wherein the combined media communication is personalized to the recipient based at least on an event associated with the recipient.

3. The method of claim 2, wherein the event is at least one of a birthday, an anniversary, a graduation, or a wedding.

4. The method of claim 2, further comprising suggesting to a first contributor of the plurality of contributors, based on the event and an interest level of the first contributor, to contribute to the combined media communication.

5. The method of claim 4, wherein the interest level of the first contributor is determined based on a frequency of interactions between the first contributor and the recipient.

6. The method of claim 1, wherein providing the combined media communication comprises posting the combined media communication on a social network.

7. The method of claim 1, wherein selecting the plurality of contributors comprises:
 providing to a first contributor a list of social contacts of at least one of the recipient and the first contributor;
 receiving a list of the plurality of contributors from the first contributor, the plurality of contributors being selected by the first contributor from the list of social contacts; and
 providing an invitation to each of the plurality of contributors on the list to contribute at least one media communication of the combined media communication.

8. The method of claim 7, wherein selecting the plurality of contributors comprises selecting each contributor of the plurality of contributors based upon a time of a last interaction between the selected contributor and the first contributor.

9. The method of claim 1, wherein selecting the plurality of contributors comprises selecting each contributor of the plurality of contributors based upon a length of time of a relationship between the selected contributor and the recipient.

10. The method of claim 1, wherein the combined media communication comprise at least one of a video captured from a mobile device, a video captured from a computer camera, an image associated with an audio message, or a file uploaded to a social network.

11. The method of claim 1, wherein the network comprises at least one of a social network or a contact list.

12. A method comprising:
 identifying an event relevant to a first contact;
 identifying a network member associated with the first contact;
 determining an interest level of the network member in contributing to personalized content related to the event, wherein the interest level is based at least in part on a call history between the network member and the first contact;
 notifying the network member of the event relevant to the first contact;
 providing the network member an interface configured for organizing a collaboration between the network member and a plurality of other network members to create the personalized content related to the event; and
 composing the personalized content based at least on a compilation of one or more media communications from the network member and one or more media communications from the plurality of other network members.

13. The method of claim 12, further comprising sending the personalized content to the first contact.

14. The method of claim 12, wherein the event is at least one of a birthday, an anniversary, a graduation, and a wedding.

15. The method of claim 12, further comprising identifying a set of social contacts from at least one of a social network or an address book, wherein the set of social contacts includes the first contact.

16. The method of claim 12, further comprising:
 determining if the interest level reaches a predefined threshold; and
 suggesting to the network member to contribute to the personalized content.

17. The method of claim 12, wherein determining the interest level of the network member is based on a classification of a relationship between the network member and the first contact.

18. The method of claim 12, wherein providing the network member the interface configured for organizing the collaboration comprises posting at least a part of the personalized content on a social network.

19. The method of claim 12, wherein providing the network member the interface configured for organizing the collaboration comprises suggesting the plurality of other network members to the network member based at least on a social relationship of the plurality of other network members to the first contact.

20. The method of claim 12, further comprising selecting the plurality of other network members based upon a frequency of interactions between the selected other network member and the first contact.

21. The method of claim 12, further comprising selecting the plurality of other network members based upon a time of a last interaction between the selected other network member and the network member.

22. The method of claim 12, wherein the interface is configured to allow at least one of the network member and the plurality of other network members to edit the personalized content.

23. A method comprising:
 determining an interest level in contributing to a media communication for a recipient, wherein the interest level is based at least in part on a call history between the recipient and a social contact of the recipient;
 selecting a plurality of contributors from social contacts of the recipient, wherein at least one contributor of the plurality of contributors is selected based on the interest level;
 receiving two or more media communications in one or more formats from at least two of the plurality of contributors;
 combining the two or more media communications into a combined media communication in one format; and
 providing the combined media communication in one format to the recipient, wherein the combined media communication in one format is editable by additional contributors after the media communication in one format is provided to the recipient.

24. The method of claim 23, wherein the combined media communication in one format is provided to the recipient on a social network, wherein the additional contributors are social contacts on the social network who can access the combined media communication in one format.

25. The method of claim 23, wherein the one format is a video format.

26. A method comprising:
 determining an interest level in contributing to a composite media communication for a recipient;
 selecting, based on the interest level, a plurality of users associated with the recipient, the plurality of users comprising a small-world network, wherein the interest level is based at least in part on a call history between the recipient and the plurality of users;

receiving a first media communication in a first format from a first user, wherein the plurality of users and the first user are social contacts of the recipient;

providing the first media communication to the plurality of users;

receiving one or more additional media communications from a second user within the plurality of users;

combining the first media communication and the one or more additional media communications into the composite media communication; and providing the composite media communication to the recipient.

27. The method of claim 26, wherein the first format is a video format.

28. The method of claim 26, wherein the first media communication is provided to the plurality of users through a mobile device.

29. The method of claim 1, wherein the call history comprises a list of communications from a first device and to the first device, and wherein the list of communications comprises a plurality of devices with which the first device has communicated.

30. The method of claim 12, wherein the call history comprises a list of communications from a first device and to the first device, and wherein the list of communications comprises a plurality of devices with which the first device has communicated.

31. The method of claim 23, wherein the call history comprises a list of communications from a first device and to the first device, and wherein the list of communications comprises a plurality of devices with which the first device has communicated.

32. The method of claim 26, wherein the call history comprises a list of communications from a first device and to the first device, and wherein the list of communications comprises a plurality of devices with which the first device has communicated.

33. The method of claim 1, wherein the interest level in contributing to the media communication for the recipient is determined at least in part based on an amount of time since the user and the recipient last communicated.

34. The method of claim 12, wherein the interest level of the network member in contributing to personalized content related to the event is based at least in part on an amount of time since the network member and the first contact last communicated.

35. The method of claim 23, wherein the interest level in contributing to the media communication for the recipient is based at least in part on an amount of time since the recipient and the social contact of the recipient last communicated.

36. The method of claim 26, wherein the interest level is based at least in part on an amount of time since the recipient and the plurality of users last communicated.

* * * * *